June 27, 1961 T. C. G. WAGNER 2,990,519

TRANSISTOR OSCILLATOR

Filed Nov. 4, 1957

*INVENTOR.*
THOMAS C. G. WAGNER

BY Arthur H. Swanson

ATTORNEY.

United States Patent Office 2,990,519
Patented June 27, 1961

2,990,519
TRANSISTOR OSCILLATOR

Thomas C. G. Wagner, Rockville, Md., assignor to Minneapolis-Honeywell Regulator Company, Minneapolis, Minn., a corporation of Delaware
Filed Nov. 4, 1957, Ser. No. 694,458
6 Claims. (Cl. 331—113)

This invention pertains to apparatus for converting direct current power into alternating current power. More specifically, the present invention is concerned with the type of power converter in which a pair of transistors is employed to alternately switch a source of direct current across the primary winding sections of the transformer.

A general object of the present invention is to improve the efficiency of the above described type of power converter.

Another object of the present invention is to employ new and improved means for controlling the instantaneous voltage across and current through switching transistors.

Power may be lost in a transistor when it is conducting, when it is off, or during the transition between the on and off states. The thermal time constant of even a large power transistor may be of the order of fifty microseconds or less, so that from the standpoint of transistor protection, the instantaneous or quasi-instantaneous power dissipation must be controlled.

If a pair of transistors are employed to switch a purely resistive load, the peak power dissipation of one transistor will occur in the middle of each transition and will have a value of one half the total average power delivered to the load by both transistors. The dissipation averaged over the period of a single transition will be one third the power delivered to the load. Thus, if the transition time is not small compared to the thermal time constant of the transistors, the power handling capabilities of a pair of transistors with a resistive load is limited to two or three times the rating of a single transistor. Further, it will be found that in most cases where the transistors see a resistive load, most of the average transistor dissipation is a result of the transition loss.

If the load presented to the transistors is reactive, the situation may be worse, or, on the other hand, with the proper reactance and the proper drive, a great improvement may be realized.

The instantaneous power lost is given by the instantaneous value of the product of the voltage across the transistor and the current through it. During the conduction period, the dissipated power is small because the voltage is essentially zero. In order that the instantaneous power lost during the transition be small, it is necessary that the current passing through the transistor be small. This can be accomplished by quickly cutting off the current of the transistor and slowing down the change of the voltage across the transistor during the transitions.

Still another object of the present invention is to employ synchronizing pulses at rate higher than the free running frequency of the power converter to drive the transistors to a low current state, from a low-voltage high-current state, before they are in a high-voltage state.

A further object of the present invention is to utilize a capacitor connected across the transformer primary winding to control the voltage across the transistors during the transitions.

A better understanding of the present invention may be had from the following description read with reference to the accompanying drawings, of which:

Figure 1:
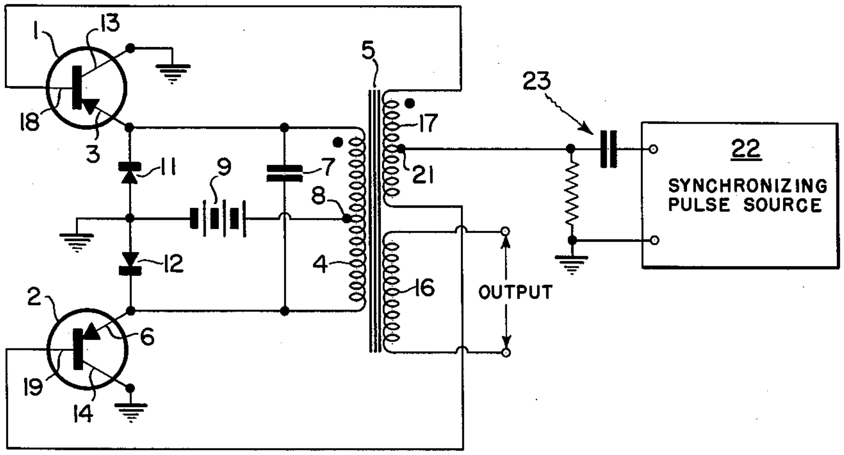
FIG. 1 is a circuit diagram of a preferred embodiment of the present invention.

Referring now to FIG. 1, there is shown a circuit diagram of a preferred embodiment of the present invention. The numerals 1 and 2 designate a pair of pnp junction transistors. The transistors 1 and 2 have the usual emitter, collector, and base electrodes. As shown, the emitter 3 of the transistor 1 is connected to one end of a primary winding 4 of a transformer 5. Similarly, the emitter 6 of the transistor 2 is connected to the other end terminal of the primary winding 4. A capacitor 7 is connected across the primary winding 4 of the transformer 5. The primary winding 4 of the transformer 5 has a center tap 8 which is connected to the positive terminal of a source of D.C. power, shown here as the battery 9. The negative terminal of the battery 9 is connected to ground. The emitter 3 of the transistor 2 is connected to ground through the diode 11 which is poled to pass current in the direction toward the emitter 3. Similarly, the emitter 6 of the transistor 2 is connected to ground through a diode 12 which is poled to pass the current in the direction of the emitter 6. As shown, the collector 13 of the transistor 1, and the collector 14 of the transistor 2 are connected to ground.

As shown, the transformer 5 has an output secondary winding 16 and a center tapped feedback winding 17. The feedback winding 17 is wound with respect to the primary winding 4 to provide the polarities indicated by the polarity marks. The base 18 of the transistor 3 is connected into one end of the feedback winding 17 and the base 19 of the transistor 2 is connected to the other end of the feedback winding 17. The feedback winding 17 has a center tap 21 which is connected to a source of synchronizing pulses 22 by means of the R–C coupling network 23.

In considering the operation of the circuit of FIG. 1, it should first be noted that without synchronizing pulses the circuit would be a free-running oscillator. As shown, the transistors 1 and 2 are each connected with a common collector configuration in a push-pull arrangement across the equal winding sections of the primary winding 4 of the transformer 5. The base signal for the transistors 1 and 2 is supplied through the feedback winding 17 of the transformer 5. As shown in FIG. 1, the transistors 1 and 2 have their respective bases 18 and 19 connected to a corresponding end of the feedback winding 17. Thus, the polarity of the feedback signal applied to one transistor base is the opposite of that applied to the other transistor base. This connection of the feedback winding 17 is effective to permit one transistor to conduct while the other transistor is held in a non-conducting state. Assume the first transistor 1 is initially in a conducting condition, and the second transistor 2 is in a non-conducting condition. The current from the battery 9 passing through the first transistor 1 and the corresponding half of the primary winding 4 is effective to develop a negative feedback signal at the end of the feedback winding 17 connected to the base 18 of the first transistor 1.

Figure 2:
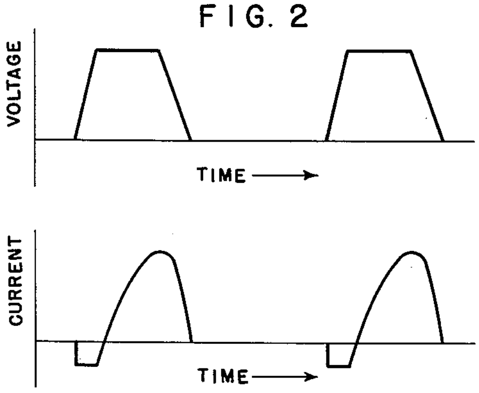
FIG. 2 shows the curves of the voltage across and the current through one of the transistors in the embodiment of the present invention shown in FIG. 1 as they would be without synchronization.

Referring to the waveshapes shown in FIG. 2, there are shown the voltage and current waveshapes associated with one of the transistors 1 and 2 during the absence of any synchronizing signals. In the early portion of the cycle, it may be seen that the transistor is conducting in the reverse direction. An alloy junction transistor may conduct in a reverse direction even though conduction in the reverse direction is not normally intended. Thus, in a common collector or common emitter configuration, the symmetrical characteristic of the transistor will enable it to function as a reverse transistor. For example, a relatively large current can be passed by a pnp transistor with the emitter at a negative potential with respect to the collector if the base were also negative with respect to the collector. In this case, the emitter and collector exchange roles, and a small current passing between the base and the collector will allow a larger current to pass between the collector and the emitter. Continuing the above operation with the first transistor 1 in a conducting condition, it may be seen from FIG. 2 that the first transistor 1 conducts in a reverse direction until the voltage is limited by the associated diode 11 connected to the emitter thereof. Subsequently, the current reverses and increases in normal direction until the first transistor 1 saturates; i.e., the current reaches the limiting current amplitude of the first transistor 1 circuit. At this point the current in the primary winding 4 of the transformer 5 is limited to a constant value. This constant current is ineffective to produce a signal on the secondary winding 17 as a signal for the base 18 of the first transistor 1. This loss of a base signal, in turn, is effective to decrease the conduction through the first transistor. The decrease of the current through the first transistor 1 and the primary winding 4 is effective to reverse the polarity of the signal across the secondary winding 17. This reversed signal is applied to the base 18 to aid in terminating the conducting state of the first transistor 1. As shown in FIG. 2, the voltage and current decrease to a zero level to terminate the current conduction through the first transistor 1. At this time, the voltage starts to increase across the second transistor 2 to initiate a conductive state therein. The conducting cycle of the second transistor 2 is similar to that described above with relation to the first transistor with the use of the lower half of the transformer 5 for conducting the current passing through the second transistor 2. Thus, the transistors 1 and 2 alternately switch the current from the battery 9 through the equal sections of the primary winding 4. Since this switching action effectively reverses the direction of the current flow in the primary winding 4, the output signal at the output winding 16 is a succession of alternately positive and negative signals.

The above described operation has the disadvantage of wasting power in the transistors 1 and 2 during the switching time. As shown in FIG. 2, the voltage and current of a conducting transistor slowly decrease to a non-conducting condition. As previously mentioned, the power wasted in the transistor during this period is the product of the instantaneous current and voltage. Consequently, it is desirable to reduce the current to a zero value before the voltage has started to decrease from the conducting state where a transistor is a low-loss device.

As shown in FIG. 1, the present invention includes a source of synchronizing pulses 22 and a capacitor 7 across the primary winding 4. The synchronizing pulse source 22 applies positive pulses to the bases 18 and 19 of the transistors 1 and 2 respectively through the feedback winding 17 of the transformer 5. These positive synchronizing pulses are applied at a rate of twice the frequency of controlled operation; the controlled frequency must be higher than the free running frequency. The synchronizing pulses at the bases of the transistors 1 and 2 drive the transistors quickly through the transition from a low-voltage, high-current state to a high-voltage, low-current state. The reversal of the voltage across the transformer 5 is controlled by the capacitor 7 which slows down the voltage change so that the above synchronizing effect is possible. The diodes 11 and 12 function to prevent an overswing during the time both transistors are cut off. The synchronizing pulse source 22 may be any oscillator of a suitable frequency, however, to derive a constant frequency output voltage from the circuit it is desirable that the pulse source 22 maintain a constant frequency.

Figure 3:
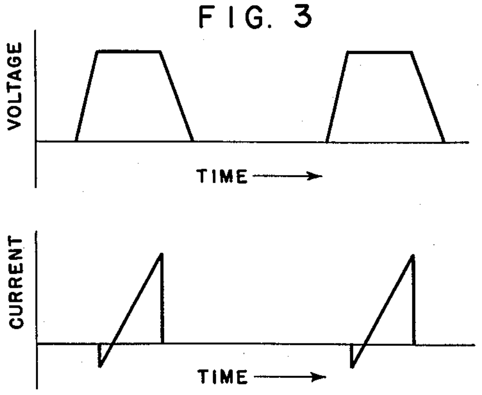
FIG. 3 shows the curves of the voltage across and the current through one of the transistors in the embodiment of the present invention shown in FIG. 1.

For a better understanding in the operation of the circuit of FIG. 1, reference may be had to the curves shown in FIGS. 2, 3, 4, 5, and 6. FIG. 2, as previously discussed, shows the curves of the voltage across and the current through one of the transistors in the embodiment of the present invention shown in FIG. 1, as they would be without synchronization. In FIG. 3 there are shown curves of the voltage across and the current through one of the transistors of FIG. 1 in an ideal case with synchronization. The important feature is that the current be zero before the voltage across the transistor has any appreciable value.

As shown in FIG. 3, the current is reduced to a zero level by a synchronizing pulse applied to the base of the conducting transistor. Of course, the pulse also appears at the base of the non-conducting transistor. As this transistor is in a non-conducting condition, the synchronizing pulse has no further effect. However, when the voltage across the conducting transistor has dropped to a zero level, the synchronizing pulse is terminated, and the base signal from the feedback winding 17 is left to control the transistors 1 and 2. The subsequent operation is similar to that previously described with relation to a circuit without the synchronizing pulses; i.e. the non-conducting transistor is driven to a conducting state. Subsequently, the synchronizing pulse is again applied to the circuit to drive the conducting transistor current to a zero level. Further operation of the present invention is a continuation of the cycle described above.

Figure 4:
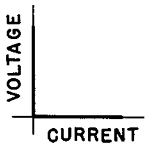
FIG. 4 shows a Lissajous figure of the voltage across and the current through one of the transistors in the embodiment of the present invention shown in FIG. 1.
Figure 5:
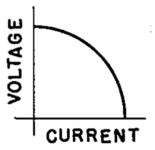
FIG. 5 shows a Lissajous figure of the voltage across and the current through one of the transistors in the embodiment of the present invention without the synchronization and capacitor.
Figure 6:
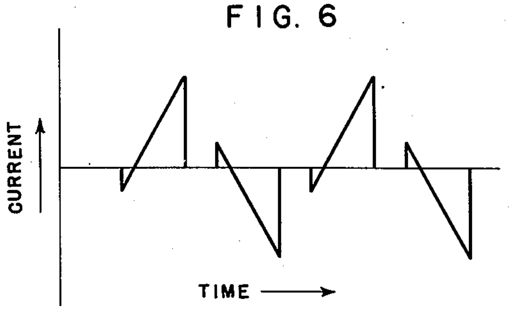
FIG. 6 is a curve showing the combined currents of the two transistors employed in the embodiment of the present invention shown in FIG. 1.

FIGS. 4 and 5 show Lissajous figures of the voltage across and the current through one of the transistors in the embodiment of the present invention shown in FIG. 1, with and without synchronization and the capacitor 7, respectively. In FIG. 6 there is shown a curve showing the combined currents in the two transistors shown in FIG. 1. Neglecting the current flow through the capacitor 7, this is the current which is effectively flowing into the primary winding 4 of the transformer 5.

It will be noted that the base drive is supplied during conduction by the transistors themselves. While a certain fraction of the power output must be supplied as base inputs, the actual circuit configuration cannot effect the overall electrical performance to any great degree. It should be noted that the self-excitation feature of the circuit is not a necessity but it is easier to obtain the proper base drive with this arrangement.

It should be noted that while the embodiment of the present invention described employs pnp junction type transistors that with suitable change in circuit polarities npn junction transistors could be employed.

Having now described the present invention, that which is claimed as new and which it is desired to secure by Letters Patent is:

1. An apparatus for converting direct current to alternating current comprising, in combination, a pair of transistors, each of said transistors having a first, a second and a third electrode, a transformer having a center-tapped primary winding and a center-tapped secondary winding, said first electrodes of each of said transistors being connected, respectively, to opposite ends of said primary winding, a source of direct current, means connecting said center-tap of said transformer primary winding to one side of said source, said second electrodes of said transistors being connected together and to the other side of said source, feedback means connecting the ends of said secondary winding of said transformer, respectively, to the third electrodes of said transistors, and means connected to said center-tap of said secondary winding to cut off said transistors at the time maximum conduction is reached, said last mentioned means comprising a source of synchronizing pulses having a frequency higher than that of said oscillator.

2. Apparatus as specified in claim 1 wherein a capacitor is connected across said transformer primary winding to slow down the change of voltage across said transistors to cause said last named means to cut off said transistors before the transistors are in a high voltage state.

3. An oscillator for converting direct current power to alternating current power comprising, in combination, a pair of transistors each having an emitter, a collector, and a base, a transformer having a center-tapped primary winding and a center-tapped secondary winding, the emitter of one of said transistors being connected to one end of said primary winding, the emitter of the other of said transistors being connected to the other end of said primary winding, a pair of terminals adapted to be connected to a source of direct current power, the collectors of both of said transistors being connected together and to one of said terminals, the center-tap of said primary winding being connected to the other of said terminals, the base of one of said transistors being connected to one end of said secondary winding, the base electrode of the other of said transistors being connected to the other end of said secondary winding, and means connected to the center-tap of said secondary winding to drive said transistors to a low current state, from a low-voltage high-current state, before said transistors are on a high-voltage.

4. Apparatus as specified in claim 3 wherein said last named means comprises a source of synchronizing pulses having a frequency of twice the frequency of said oscillator.

5. An oscillator for converting direct current power to alternating current power comprising, in combination, a pair of transistors each having an emitter, a collector, and a base, a transformer having a center-tapped primary winding and a center-tapped secondary winding, the emitter of one of said transistors being connected to one end of said primary winding, the emitter of the other of said transistors being connected to the other end of said primary winding, a capacitor connected across said primary winding, a pair of terminals adapted to be connected to a source of direct current power, the collector of both of said transistors being connected together to one of said terminals, the center-tap of said primary winding being connected to the other of said terminals, each of said transistors having a diode connected between its emitter and collector, said diodes being poled to pass current from the collector of the associated transistor to the emitter of the associated transistor, the base of one of said transistors being connected to one end of said secondary winding, the base of the other of said transistors being connected to the other end of said secondary winding, and a source of synchronizing pulses connected to the center-tap of said secondary winding, the frequency of said pulses being twice the frequency of the oscillator and of such a polarity as to drive said transistors to a low current state, from a low-voltage high-current state, before they are in a high-voltage state.

6. Apparatus as specified in claim 5 wherein said transformer has an additional secondary winding adapted to be connected to a load.

References Cited in the file of this patent

UNITED STATES PATENTS

| | | |
|---|---|---|
| 2,643,340 | Lawrance | June 23, 1953 |
| 2,783,380 | Bonn | Feb. 26, 1957 |
| 2,804,547 | Mortimer | Aug. 27, 1957 |
| 2,831,986 | Sumner | Apr. 22, 1958 |